United States Patent [19]

Saida et al.

[11] Patent Number: 6,019,163
[45] Date of Patent: Feb. 1, 2000

[54] AIR CONDITIONING APPARATUS FOR VEHICLE WITH AIR DEFLECTORS ON AIR-MIX DOORS

[75] Inventors: Kazunori Saida, Kariya; Hiromi Tahara, Toyota, both of Japan

[73] Assignee: Denso Corporation, Kariya, Japan

[21] Appl. No.: 09/152,569

[22] Filed: Sep. 14, 1998

[30] Foreign Application Priority Data

Sep. 25, 1997 [JP] Japan .................................... 9-260628
Aug. 3, 1998 [JP] Japan .................................. 10-219041

[51] Int. Cl.[7] .................................................. F25B 29/00
[52] U.S. Cl. .............................. 165/42; 165/43; 165/203; 165/101; 237/12.3 A; 237/12.3 B; 454/126; 454/160; 454/161
[58] Field of Search ................................ 165/42, 43, 203, 165/101; 237/12.3 A, 12.3 B; 454/126, 160, 161

[56] References Cited

U.S. PATENT DOCUMENTS

| | | | |
|---|---|---|---|
| 4,420,115 | 12/1983 | Matsushima et al. | 454/161 |
| 4,577,836 | 3/1986 | Guillemin | 454/160 |
| 4,972,992 | 11/1990 | Scheidel et al. | 454/161 |
| 4,991,646 | 2/1991 | Spears | 165/122 |
| 5,101,883 | 4/1992 | Kinmartia et al. | 165/43 |
| 5,476,418 | 12/1995 | Loup | 454/121 |
| 5,711,368 | 1/1998 | Ito et al. | 165/42 |
| 5,755,107 | 5/1998 | Shirota et al. | |
| 5,857,905 | 1/1999 | Uemura et al. | 165/43 |

FOREIGN PATENT DOCUMENTS

| | | | |
|---|---|---|---|
| 3417370 | 11/1984 | Germany | 454/160 |
| 0099409 | 7/1980 | Japan | 454/160 |

*Primary Examiner*—John K. Ford
*Attorney, Agent, or Firm*—Harness, Dickey & Pierce, PLC

[57] ABSTRACT

An air conditioning apparatus for a vehicle includes an evaporator and a heater core disposed approximately horizontally. In the air conditioning apparatus, an air-mixing door for adjusting a flow ratio of air passing through the heater core and air passing through a bypass passage is disposed, and air guide plates for guiding air are formed on a surface of the air-mixing door, positioned at a side of the bypass passage. A blower is disposed so that air is blown in an air-blowing direction approximately horizontally, and thereafter flows upwardly toward the heater core. The air guide plates guide air from a forward side toward a backward side of the air-blowing direction. Thus, in the air conditioning apparatus, a flow distribution and a temperature distribution of air to be blown toward the passenger compartment can be made uniform.

16 Claims, 7 Drawing Sheets

AIR CONDITIONING APPARATUS FOR VEHICLE WITH AIR DEFLECTORS ON AIR-MIX DOORS

CROSS-REFERENCE TO RELATED APPLICATION

This application is related to and claims priority from Japanese Patent Applications No. 9-260628 filed on Sep. 25, 1997, and No. 10-219041 filed on Aug. 3, 1998, the contents of which are hereby incorporated by reference.

BACKGROUND OF THE INVENTION

1. Field of the Invention:

The present invention relates to an air conditioning apparatus for a vehicle, in which a heat exchanger is disposed approximately horizontally and air blown from a blower passes through the heat exchanger upwardly from below.

2. Description of Related Art:

An air conditioning apparatus for a vehicle is described in U.S. Pat. No. 5,755,107. In the conventional air conditioning apparatus, a cooling heat exchanger is disposed in an air conditioning case approximately horizontally, a heating heat exchanger is disposed approximately horizontally in the air conditioning case at an upper side of the cooling heat exchanger, and a blower is disposed at a side of the air conditioning case.

In the conventional air conditioning apparatus, air is blown from the blower toward a lower side of the cooling heat exchanger approximately horizontally in a vehicle width direction, and passes through the cooling heat exchanger and the heating heat exchanger upwardly after the flow of air is bent from a horizontal direction to a vertical direction. Therefore, air blown from the blower mainly flows toward an air-blowing forward side of the cooling heat exchanger in the vehicle width direction by inertia. Further, because the cooling heat exchanger is inclined downwardly toward the air-blowing forward side to improve drain performance of condensed water generated in the cooling heat exchanger, air blown from the blower partially mainly flows toward the air-blowing forward side along the inclination of the cooling heat exchanger. On the other hand, in the conventional air conditioning apparatus, a bypass passage is provided adjacent to the heating heat exchanger at the upper side of the cooling heat exchanger. However, the heating heat exchanger and the bypass passage are arranged adjacently in a direction perpendicular to an approximately horizontal air-blowing direction from the blower toward a lower side of the cooling heat exchanger. Thus, a flow dispersion of air passing through the cooling heat exchanger and the heating heat exchanger becomes larger. As a result, an ununiform flow distribution and an ununiform temperature distribution of air blown toward the passenger compartment are caused.

SUMMARY OF THE INVENTION

In view of the foregoing problems, it is an object of the present invention to provide an air conditioning apparatus for a vehicle, in which a cooling heat exchanger and a heating heat exchanger are disposed approximately horizontally so that air blown toward a passenger compartment has a uniform flow distribution an a uniform temperature distribution.

According to the present invention, an air conditioning apparatus for a vehicle includes a cooling heat exchanger disposed in an air conditioning case approximately horizontally, a heating heat exchanger disposed in the air conditioning case approximately horizontally to form a bypass passage through which air having passed through the cooling heat exchanger bypasses the heating heat exchanger, an air-mixing door for adjusting a ratio between an amount of air passing through the heating heat exchanger and an amount of air passing through the bypass passage, and an air guide plate formed on a surface of the air-mixing door. In the air conditioning apparatus, a blower is disposed in such a manner that air blown by the blower has an air-blowing direction extending approximately horizontally at a lower side of the heating heat exchanger in the air conditioning case, the heating heat exchanger is disposed at an upper side of the cooling heat exchanger so that air from the cooling heat exchanger upwardly flows through the heating heat exchanger from below, the heating heat exchanger and the bypass passage are arranged adjacently in a direction perpendicular to the air-blowing direction, and the air guide plate is formed to prevent air blown by the blower from mainly flowing toward a forward side in the air-blowing direction. Thus, air blown from the heating heat exchanger and the bypass passage has a uniform flow distribution and a uniform temperature distribution.

Preferably, the air guide plate is formed on a surface of the air-mixing door, positioned at a side of the bypass passage. Therefore, at a side of the bypass passage having a small flow resistance, air is effectively guided by the guide plate to decrease an ununiform flow distribution and an ununiform temperature distribution of air blown toward the passenger compartment, even if a face mode is set.

More preferably, the air guide plate is formed on a surface of the air-mixing door, positioned at a side of the heating heat exchanger. Therefore, even if the maximum heating mode is set, air can be uniformly blown from the heating heat exchanger.

Still more preferably, a partition member is formed in the air conditioning case to partition an air passage between the cooling heat exchanger and the heating heat exchanger into a first air passage at a forward side of the air-blowing direction and a second air passage at a backward side of the air-blowing direction. Therefore, it can further prevent air from partially mainly flowing toward a forward side of the air-blowing direction.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

Figure 1:
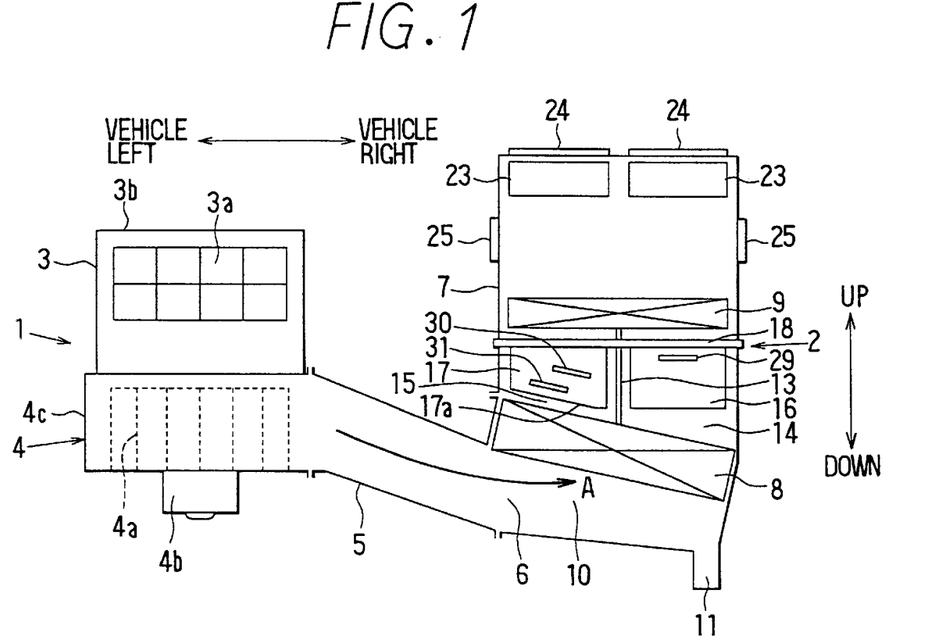
FIG. 1 is a schematic sectional view showing an air conditioning apparatus according to a first preferred embodiment of the present invention.

A first preferred embodiment of the present invention will be now described. As shown in FIG. 1, an air conditioning apparatus for a vehicle includes a blower unit 1 and an air conditioning unit 2. The air conditioning apparatus is disposed in a passenger compartment around an instrument panel. For example, in a vehicle having a right steering wheel, the air conditioning unit 2 is disposed approximately at a center portion the passenger compartment in a left-right direction (i.e., width direction) of the vehicle, and the blower unit 1 is disposed at a left side of the air conditioning unit 2 to be shifted from the center portion in the left-right direction of the vehicle.

The blower unit 1 includes an inside/outside air switching box 3 and a blower 4. The inside/outside air switching box 3 is disposed at an upper side of the blower 4. The inside/outside air switching box 3 has an inside air introduction port 3a for introducing therein inside air (i.e., air inside the passenger compartment), an outside air introduction port 3b for introducing therein outside air (i.e., air outside the passenger compartment), and an inside/outside air switching door for opening and closing both the introduction ports 3a, 3b.

The blower 4 is disposed under the inside/outside air switching box 3. The blower 4 includes a centrifugal fan (sirocco fan) 4a for blowing air, a driving motor 4b for driving the fan 4a, and a fan case 4c for accommodating the fan 4a. The fan case 4c is made of resin, and is formed in a scroll shape. An air outlet portion of the fan case 4c is connected to one end of a middle duct 5, and the other end of the middle duct 5 is connected to an air inlet portion 6 of the air conditioning unit 2. The air conditioning unit 2 includes an air conditioning case 7 made of resin, and the air inlet portion 6 is provided in a left side wall of the air conditioning case 7 at a lower side.

The air conditioning unit 2 is a horizontal type in which an evaporator (i.e., cooling heat exchanger) 8 of a refrigerant cycle and a heater core (i.e., heating heat exchanger) 9 are disposed approximately horizontally. The evaporator 6 is disposed approximately horizontally in the air conditioning case 7 to form an air passage 10 at a lower side of the evaporator 8. Thus, air blown by an operation of the centrifugal fan 4a flows into the air passage 10 through the middle duct 5 and the air inlet portion 6. As shown by an arrow A in FIG. 2, air flows through the air passage 10 approximately horizontally from a vehicle left side toward a vehicle right side in the width direction of the vehicle. Hereinafter, the air-blowing direction in the air passage 10 shown by arrow A is referred to as "air-blowing direction A".

Figure 2:
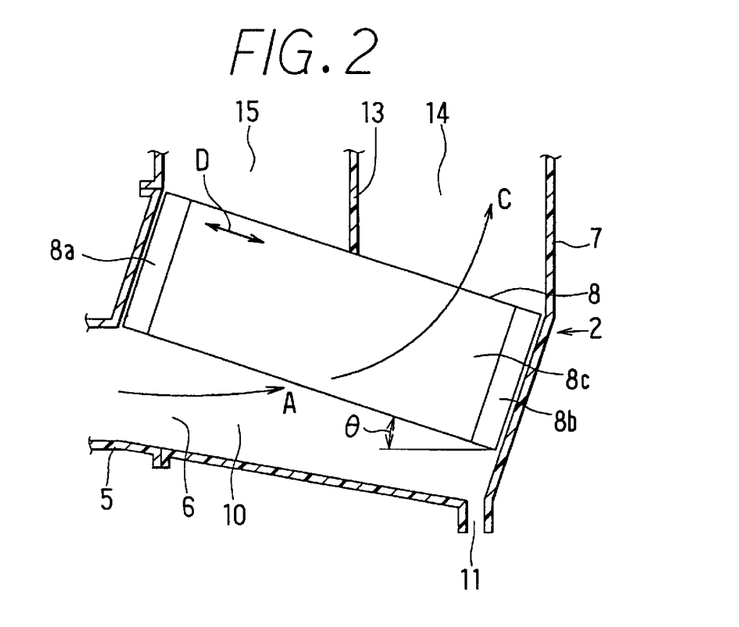
FIG. 2 is a schematic sectional view showing an evaporator of the air conditioning apparatus according to the first embodiment.

The evaporator 8 is formed in thin in a flow direction of air, and has a rectangular shape. As shown in FIG. 2, the evaporator 8 includes two tank portions 8a, 8b at two ends in the width direction of the vehicle, and a core portion 8c disposed between the two tank portions 8a, 8b. The core portion 8c has a plurality of laminated tubes and corrugated fins each of which is disposed between adjacent tubes. In the evaporator 8, a refrigerant passage is formed by the tank portions 8a, 8b and the tubes.

Each tube is disposed between the two tank portions 8a, 8b to extend in a direction approximately parallel to the width direction of the vehicle. Therefore, a longitudinal direction D of the each tube of the evaporator 8 is approximately parallel to the air-blowing direction A in the air passage 10. On the other hand, air flowing through the air passage 10 in the air-blowing direction A is bent, and passes through the evaporator 8 upwardly from below as shown by arrow C in FIG. 2. Thus, air passing through the evaporator 8 is cooled by an evaporation latent heat of refrigerant of the refrigerant cycle.

In the first embodiment, the evaporator 8 is approximately horizontally disposed at a side of the blower 4. That is, the evaporator 8 is slightly inclined relative to a horizontal direction by a predetermined inclination angle $\theta$ (e.g., $\theta=18°$). The evaporator 8 is inclined downwardly toward a forward side (i.e., vehicle right side) of the air-blowing direction A by the predetermined inclination angle $\theta$. Because the evaporator 8 is disposed to be slightly inclined, condensed water generated on the evaporator 8 can be readily gathered and discharged along the flow of air. A drain port 11 is provided in a bottom of the air conditioning case 7 at a position under an inclination lower end of the evaporator 8.

Figure 3:
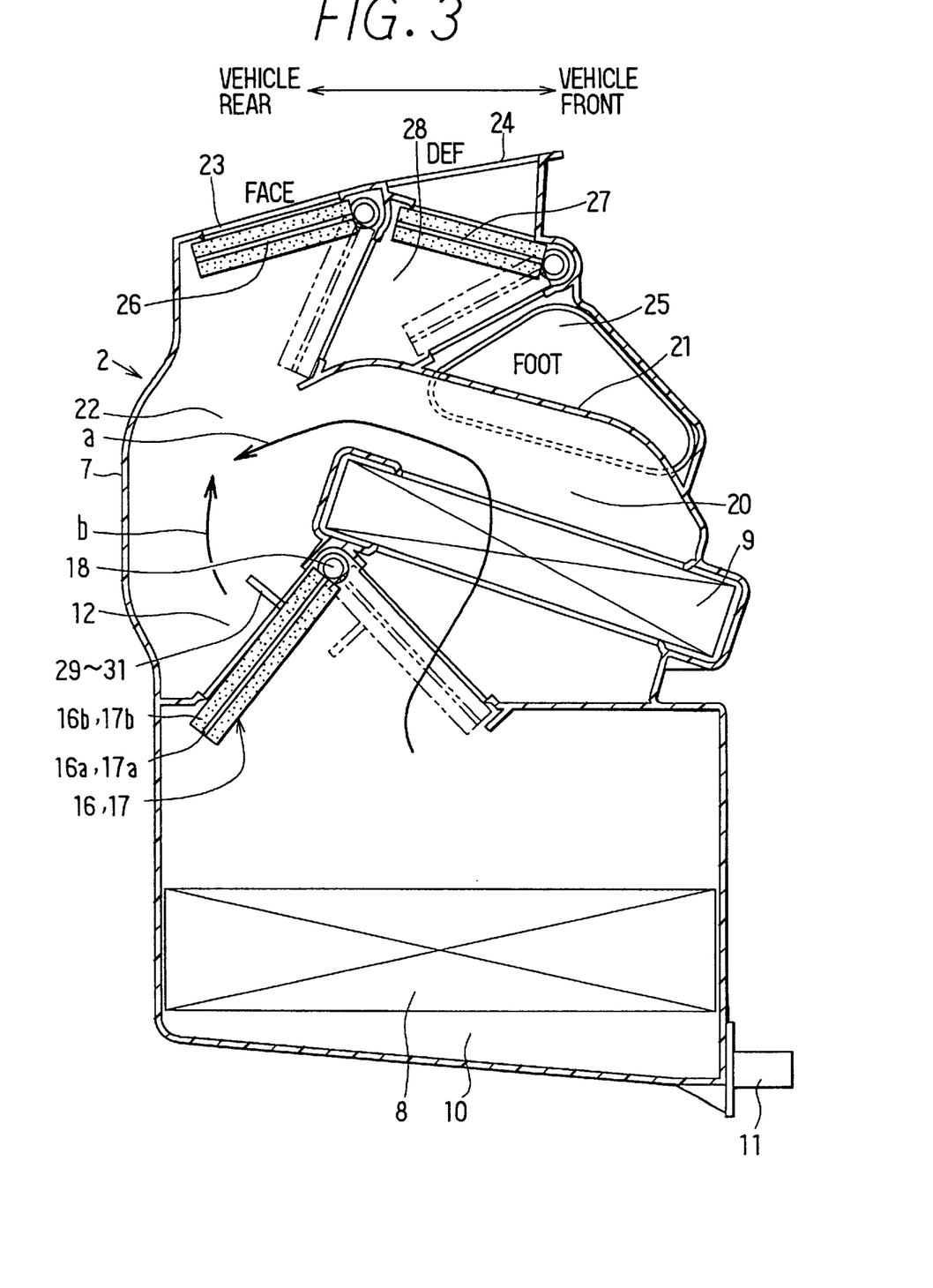
FIG. 3 is a vertical sectional view of the air conditioning apparatus according to the first embodiment.

The heater core 9 is thin in a flow direction of air, and has a rectangular shape. The heater core 9 heats air passing therethrough using hot water from an engine of the vehicle as a heating source. The heater core 9 has a tank portion for distributing and joining hot water, a plurality of tubes through which hot water flows, and corrugated fins each of which is disposed between adjacent tubes. The heater core 9 is disposed approximately horizontally in the air conditioning case 7 at an upper side of the evaporator 8 so that air from the evaporator 8 passes through the heater core 9 upwardly from below. The heater core 9 is slightly inclined by an inclination angle in a front-rear direction of the vehicle. As shown in FIG. 3, the heater core 9 is disposed in the air conditioning case 7 at a front side of the vehicle to form a bypass passage 12 at a rear side of the heater core 9 in a front-rear direction of the vehicle. Through the bypass passage 12, air having passed through the evaporator 8 bypasses the heater core 9.

The heater core 9 and the bypass passage 12 are arranged adjacently in a direction approximately perpendicular to the air-blowing direction A in the air passage 10. That is, the air-blowing direction A in the air passage 10 is approximately in the width direction of the vehicle, and the heater core 9 and the bypass passage 12 are arranged adjacently in the front-rear direction of the vehicle.

A partition member 13 is disposed between the evaporator 8 and the heater core 9 to partition an air passage in the air conditioning case 7 between the evaporator 8 and the heater core 9 into a first air passage 14 at a right side and a second air passage 15 at a left side. The partition member 13 is disposed in the air conditioning case 7 at a center in the width direction of the vehicle. The partition member 13 is formed integrally with an inner wall surface of the air conditioning case 7 by using resin.

A first air-mixing door 16 is disposed in the first air passage 14, and a second air-mixing door 17 is disposed in the second air passage 15. In the first embodiment, the first and second air-mixing doors 16, 17 are connected to a single rotation shaft 18. The rotation shaft 18 penetrates through the partition member 13, and is rotatably held in the air conditioning case 7. The first and second air-mixing doors 16, 17 adjust a ratio between an amount of air passing through the heater core 9 and an amount of air passing through the bypass passage 12 to adjust the temperature of air blown toward the passenger compartment of the vehicle.

As shown in FIG. 3, a warm air passage 20 is formed at an upper side of the heater core 9 in the air conditioning case 7 by a wall portion 21, and air passing through the heater core 9 flows into the warm air passage 20. Therefore, as shown in FIG. 3, warm air "a" from the warm air passage 20 and cool air "b" from the bypass passage 12 are mixed in an air mixing chamber 22 so that air to be blown toward the passenger compartment has a predetermined temperature.

A face opening portion 23 is provided in an upper portion of the air conditioning case 7 at a rear side of the vehicle. The face opening portion 23 communicates with a face air outlet through which air is blown toward the head portion of a passenger in the passenger compartment of the vehicle. A defroster opening portion 24 is provided in the upper portion of the air conditioning case 7 at a front side of the face opening portion 23. The defroster opening portion 24 communicates with a defroster air outlet through which air is blown toward an inner surface of a front windshield of the vehicle. Further, a foot opening portion 25 is provided on both left and right wall sides of the air conditioning case 7 at a position upper than the warm air passage 20. The foot opening portion 25 communicates with a foot air outlet through which air is blown toward the foot area of the passenger in the passenger compartment of the vehicle.

Both mode switching doors 26, 27 are rotatably disposed in the air conditioning case 7 to open and close the opening portions 23–25. That is, the mode switching door 26 opens and closes the face opening portion 23 and an inlet of a communication path 28, and the mode switching door 27 opens and closes the defroster opening portion 24 and the foot opening portion 25 while rotating between the communication path 28 and the defroster opening portion 24 and between the communication path 28 and the foot opening portion 25.

Next, the first and second air-mixing doors 16, 17 are described in detail. As shown in FIG. 3, each of the first and second air-mixing doors 16, 17 has a door body 16a, 17a, and a seal member 16b, 17b which is made of a porous-elastic material and is bonded to both surfaces of each door body 16a, 17a. Further, air guide plates 29–31 are formed on the surfaces of the first and second air-mixing doors 16, 17, positioned at a side of the bypass passage 12. That is, in the first embodiment, the air guide plates 29–31 are formed integrally with the first and second air-mixing doors 16, 17 to protrude from the surfaces of the air-mixing doors 16, 17 toward the side of the bypass passage 12.

Figure 4:
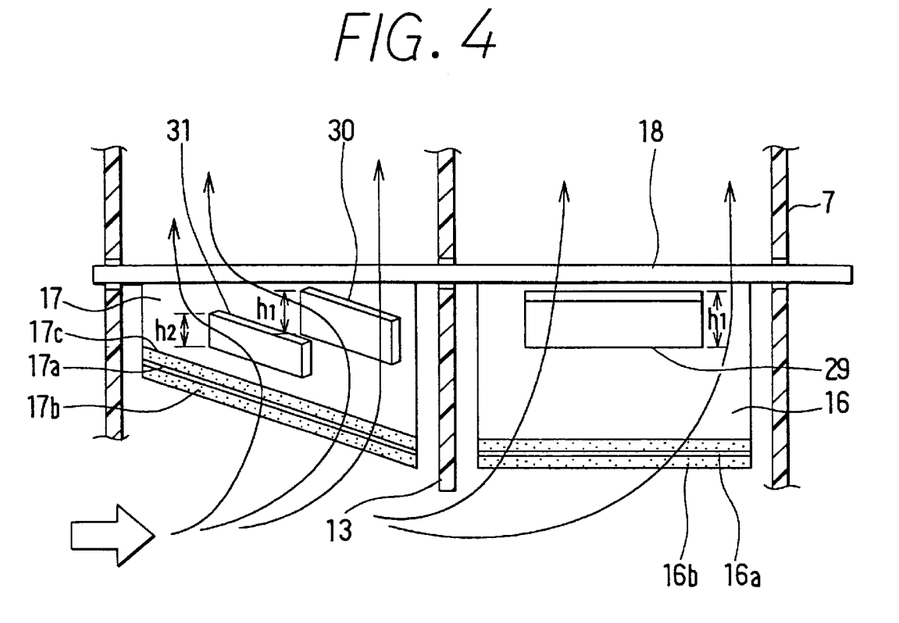
FIG. 4 is a schematic diagram showing air-guiding effect of air guide plates formed on air-mixing doors according to the first embodiment.

As shown in FIGS. 1 and 4, the first air-mixing door 16 positioned at a forward side (i.e., right side in FIGS. 1 and 4) of the air-blowing direction A has a rectangular shape having a larger length in the width direction of the vehicle. The air guide plate 29 is disposed on a side of the rotation shaft 18 at a center of the first air-mixing door 16 in a lateral direction of the first air-mixing door 16. The air guide plate 29 is arranged to be parallel to the rotation shaft 18 of the first air-mixing door 16. The air guide plate 29 has a rectangular shape having a larger length in the width direction and a height h1 protruding from the surface of the first air-mixing door 16.

On the other hand, the second air-mixing door 17 positioned at a backward side (i.e., left side in FIGS. 1 and 4) of the air-blowing direction A is disposed to prevent an interference between the evaporator 8 and the second air-mixing door 17. That is, a bottom surface of the second air-mixing door 17 is formed to have an inclination surface 17c which is inclined along the inclination angle θ of the evaporator 8. Thus, the second air-mixing door 17 is formed in a quadrilateral shape having the inclination surface 17c.

Both the air guide plates 30, 31 are formed on the second air-mixing door 17. The air guide plate 30 is disposed at a side of the partition member 13, and is formed in a rectangular shape having the height h1 equal to that of the air guide plate 29. The rectangular air guide plate 30 has a larger length in the width direction of the vehicle, and is positioned at a side of the rotation shaft 18. In the first embodiment, the air guide plate 30 is formed in parallel with the inclination surface 17c of the second air-mixing door 17.

The air guide plate 31 is formed in parallel with the inclination surface 17c near to the inclination surface 17c as compared with the air guide plate 30. The air guide plate 31 is formed in a rectangular shape having a height h2 smaller than the height h1 of each air guide plate 29, 30. In the first embodiment, the height h2 of the air guide plate 31 is about in a range of ⅓ h1 –¼ h1.

Next, an operation of the air conditioning apparatus according to the first embodiment will be now described. When an operation switch (not shown) of the air conditioning apparatus is turned on, the fan 4a of the blower 4 is rotated. Therefore, air sucked from the inside/outside air switching box 3 flows horizontally within the fan casing 4c, passes through the middle duct 5 as shown by arrow A, and flows into the air passage 10 positioned at a lower side of the evaporator 8 from the air inlet portion 6 of the air conditioning unit 2. That is, air blown from the fan 4a approximately horizontally flows from the fan casing 4c toward the air passage 10 through the middle duct 5.

Thereafter, air in the air passage 10 upwardly passes through the evaporator 8 from below as shown by arrow C in FIG. 2. Air passing through the evaporator 8 is cooled and dehumidified by refrigerant flowing through the tubes of the core portion 8c of the evaporator 8. The cooled air further flows upwardly, and is divided into air passing through the heater core 9 and air passing through the bypass passage 12 according to the rotation positions of the first and second air-mixing doors 16, 17.

Air introduced into the heater core 9 is heated to be warm air while passing through the heater core 9, and the warm air flows into the air mixing chamber 22 through the warm air passage 20. Warm air from the warm air passage 20 and cool air from the bypass passage 12 are mixed in the air mixing chamber 22, so that the temperature of air to be blown toward the passenger compartment is controlled at a predetermined temperature. Conditioned air having a predetermined temperature is blown toward the passenger compartment through at least one of the opening portions 23–25 selected by the mode switching doors 26, 27.

Figure 5:
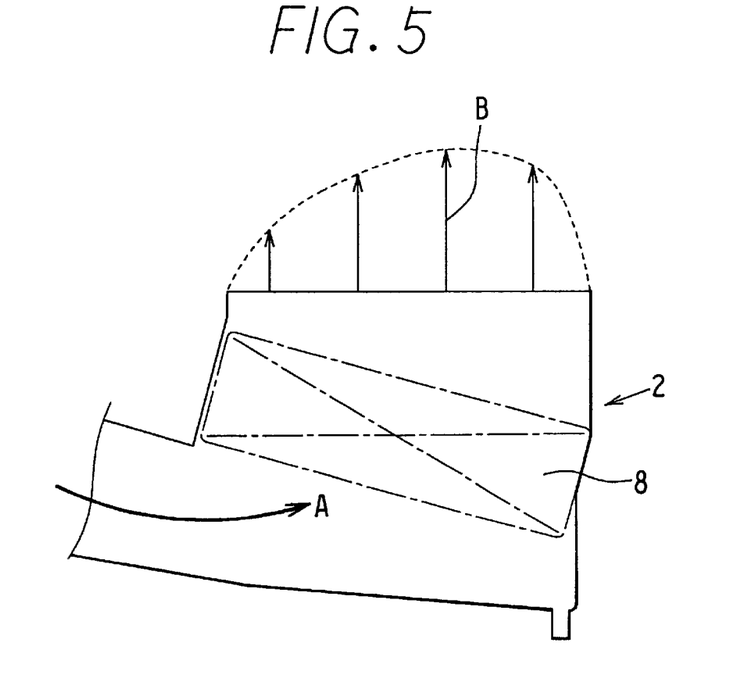
FIG. 5 is a schematic diagram showing a flow distribution of air having passed through an evaporator in a comparison case.

In the first embodiment of the present invention, air blown by the blower 4 flows approximately horizontally (i.e., width direction of the vehicle) in the air passage 10 as shown by arrow A, and then passes through the evaporator 8 from below toward an upper side after a flow direction of air is changed. Further, the evaporator 8 is inclined downwardly toward the forward side of the air-blowing direction A in the air passage 10. Thus, as shown in FIG. 5, a flow distribution of air after immediately passed through the evaporator 8 becomes ununiform. That is, at the forward side (right side of the vehicle) of the air-blowing direction A in the air passage 10 lower than the evaporator 8, the flow distribution of air having passed through the evaporator 8 becomes higher as compared with a backward side (left side of the vehicle) of the air-blowing direction A. However, according to the first embodiment of the present invention, the flow distribution of air having passed through the evaporator 8 can be made uniform by the air guide plates 29–31 formed on the first and second air-mixing doors 16, 17.

That is, the air guide plate 29 is formed in the first air-mixing door 16 to be perpendicular to a flow direction of air, and the first air-mixing door 16 is disposed in the first air passage 14 at the vehicle right side (i.e., the forward side of the air-blowing direction A). In the first embodiment of the present invention, the air guide plate 29 is disposed at a position where the flow distribution of air having passed through the evaporator 8 becomes maximum. Due to the air guide plate 29, a flow resistance of air in the first air passage 14 is increased at the position of the air guide plate 29, and air is guided at left and right two sides of the air guide plate 29. Therefore, it can prevent air from mainly flowing through the first air passage 14 at the right side of the vehicle, while the flow distribution of air in the first air passage 14 can be made uniform.

On the other hand, as shown in FIG. 4, by the inclined both air guide plates 30, 31, air can be readily guided at a left side (the backward side of the air-blowing direction A) in the second air passage 15; and therefore, the flow distribution of air in the second air passage 15 can be made uniform.

Further, according to the first embodiment of the present invention, each of the air guide plates 29–31 is provided on the surfaces of the air-mixing doors 16, 17, at the side of the bypass passage 12. When a face mode is set, air linearly flows from the bypass passage 12 toward the face opening portion 23 to have a low flow resistance. On the other hand, when a foot mode is set, air from the heater core 9 flows into the foot opening portion 25 through the bent warm air passage 20. Therefore, during the foot mode, the flow resistance of air becomes larger. That is, in a warm air passage from the heater 9 to the foot opening portion 25, air passes through the heater core 9 and flows through the bent warm air passage 20. Thus, in the warm air passage from the heater core 9 to the foot opening portion 25, air-flow resistance becomes larger as compared with that in a cool air passage from a bypass passage 12 to the face opening portion 23. As a result, the above-described ununiform flow distribution is readily affected in the cool air passage at the side of the bypass passage 12 having a low flow resistance. According to the first embodiment of the present invention, because the air guide plates 29–31 are provided on the surfaces of the air-mixing doors 16, 17 at the side of the bypass passage 12, a uniform flow distribution of air in the forward side (right side of the vehicle) and the backward side (left side of the vehicle) in the air-blowing direction A can be effectively proposed.

Further, according to the first embodiment of the present invention, the partition member 13 is disposed between the evaporator 8 and the heater core 9 at a center in the width direction of the vehicle, so that an air passage between the evaporator 8 and the heater core 9 within the air conditioning case 7 is partitioned by the partition member 13 into the first air passage 14 at the right side of the vehicle and the second air passage 15 at the left side of the vehicle. Therefore, the partition plate 13 prevents air from partially mainly flowing into the first air passage 14 at the right side of the vehicle.

Thus, according to the first embodiment of the present invention, the flow distribution (amount distribution) and temperature distribution of air blown toward the passenger compartment can be made uniform in the width direction of the vehicle, so that air-conditioning feeling for a passenger in the passenger compartment can be improved.

A second preferred embodiment of the present invention will be now described with reference to FIGS. 6–9.

In the above-described first embodiment, the first and second air-mixing doors 16, 17 are integrally rotated by the single rotation shaft 18, so that the temperature of air blown toward a right side of the passenger compartment is made equal to the temperature of air blown toward the left side of the passenger compartment. However, in the second embodiment, the present invention is applied to an air conditioning apparatus in which the temperature of air blown toward the right side in the passenger compartment and the temperature of air blown toward the left side in the passenger compartment are independently controlled. In the second embodiment, the explanation of the same portions as the first embodiment is omitted.

Figure 6:
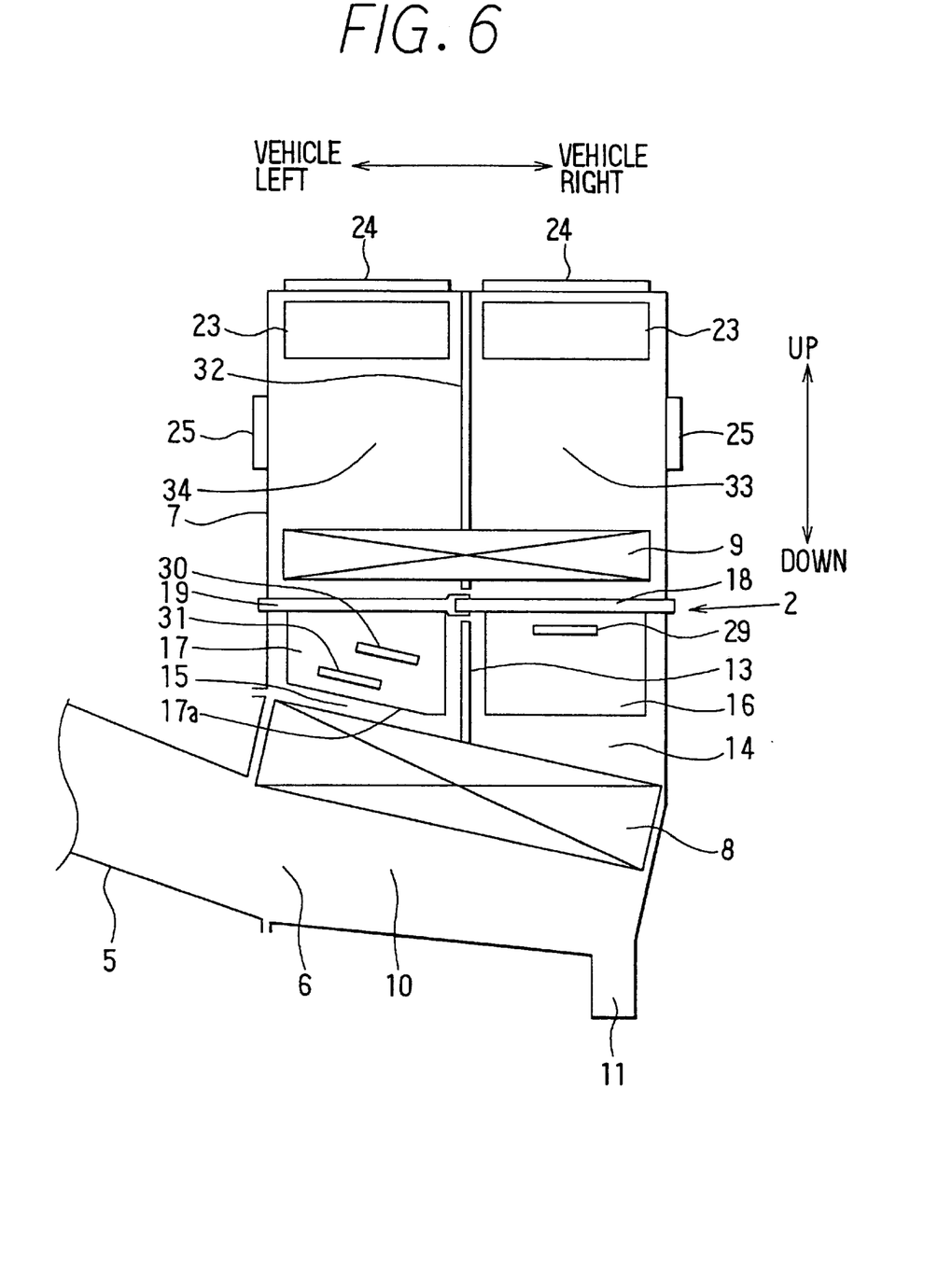
FIG. 6 is a schematic sectional view showing an air conditioning unit of an air conditioning apparatus according to a second preferred embodiment of the present invention.
Figure 7A:
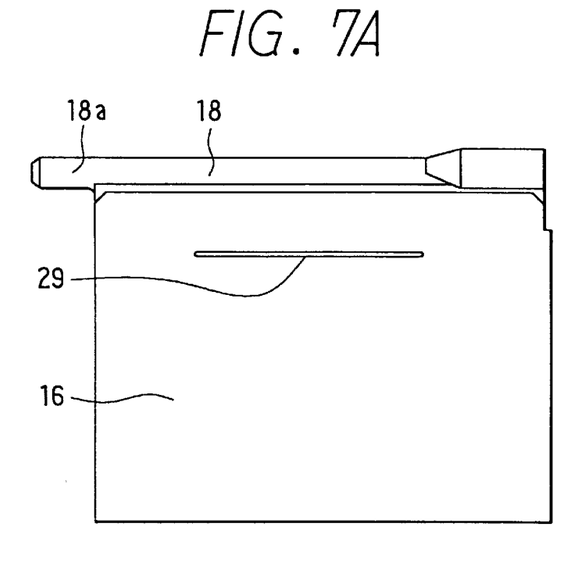
FIGS. 7A and 7B are a front view and a side view respectively, showing a first air-mixing door according to the second embodiment.
Figure 7B:
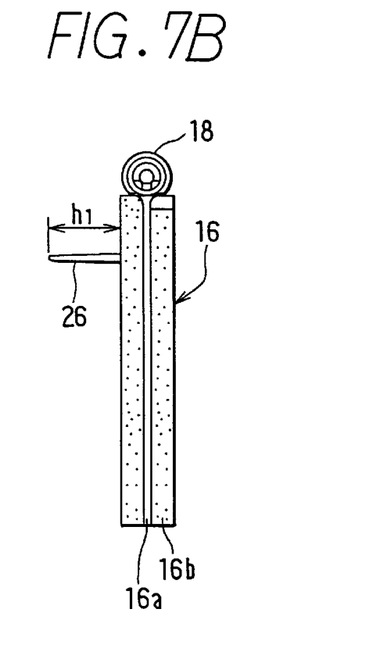
Figure 8A:
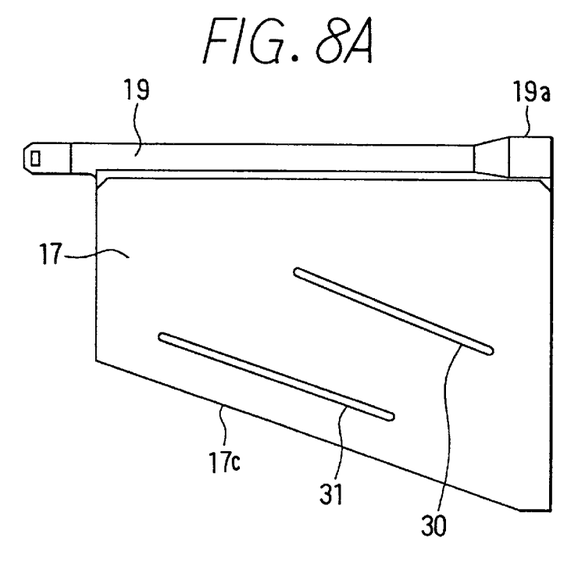
FIGS. 8A and 8B are a front view and a side view respectively, showing a second air-mixing door according to the second embodiment.
Figure 8B:
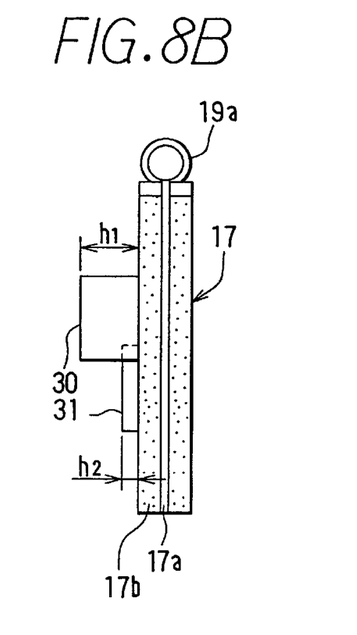

In the second embodiment, as shown in FIG. 6, a partition member 32 is additionally disposed at a downstream air side of the heater core 9, and an air passage at the downstream air side of the heater core 9 is also partitioned into a first air passage 33 at the right side of the vehicle and a second air passage 34 at the left side of the vehicle. Thus, each of the face opening portion 23, the defroster opening portion 24 and the foot opening portion 25 is partitioned into a right side opening portion communicating with the first air passage 33 and a left side opening portion communicating with the second air passage 34.

Further, the first and second air-mixing doors 16, 17 are driven and rotated by rotation shafts 18, 19, respectively. Therefore, by independently controlling rotation positions of the first and second air-mixing doors 16, 17, the temperature of air blown toward the right side of the passenger compartment and the temperature of air blown toward the left side of the passenger compartment can be independently controlled.

Similarly to the first embodiment, the air guide plates 29–31 are provided in the first and second air-mixing doors 16, 17 as shown in FIGS. 7A, 7B, 8A and 8C. Therefore, in the second embodiment, the same flow distribution effect as the first embodiment can be proposed. Further, as shown in FIGS. 17A–18B, a cylindrical portion 19a is formed at a right end portion of the rotation shaft 19 of the second air-mixing door 17, and a left end portion 18a of the rotation shaft 18 of the first air-mixing door 16 is rotatably inserted into the cylindrical portion 19a of the rotation shaft 19. Therefore, in the second embodiment, the left end portion 18a of the rotation shaft 18 of the first air-mixing door 16 is rotatably held in the rotation shaft 19 of the second air-mixing door 17.

Figure 9:
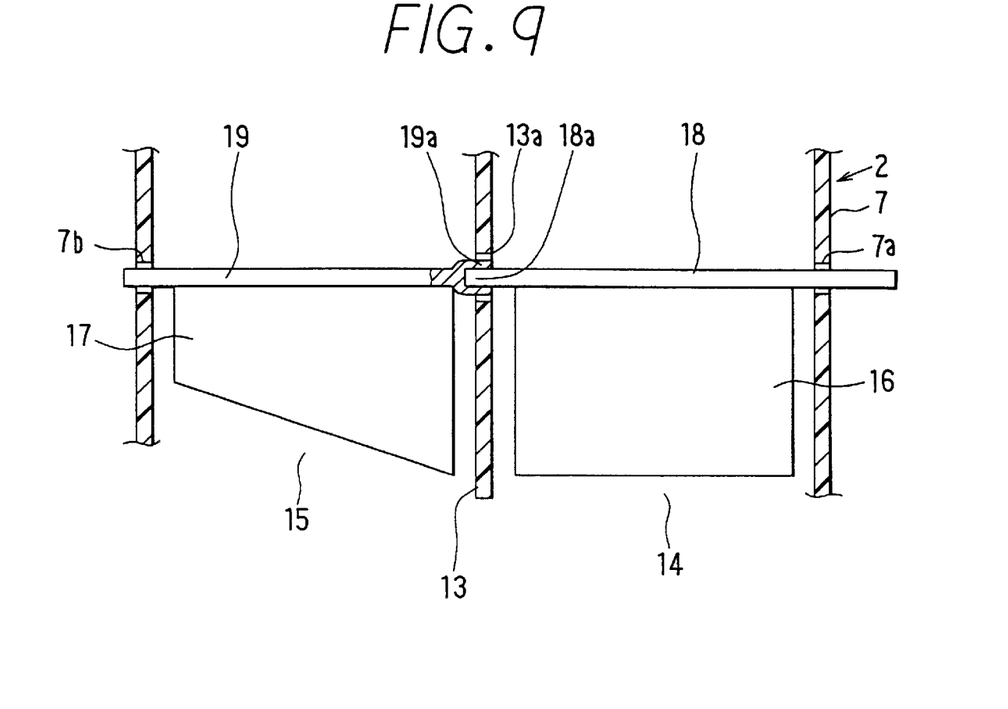
FIG. 9 is a schematic sectional view showing a supporting structure of rotation shafts of the first and second air-mixing doors according to the second embodiment.

Further, as shown in FIG. 9, the right end portion of the rotation shaft 19 of the second air-mixing door 17 is rotatably held in a bearing hole 13a formed in the partition member 13. The bearing hole 13a may be formed by a through hole penetrating through the partition member 13. Further, a right end portion of the rotation shaft 18 is rotatably held in a bearing hole 7a formed in the air conditioning case 7, and a left end portion of the rotation shaft 19 is rotatably held in a bearing hole 7b formed in the air conditioning case 7.

Figure 10:
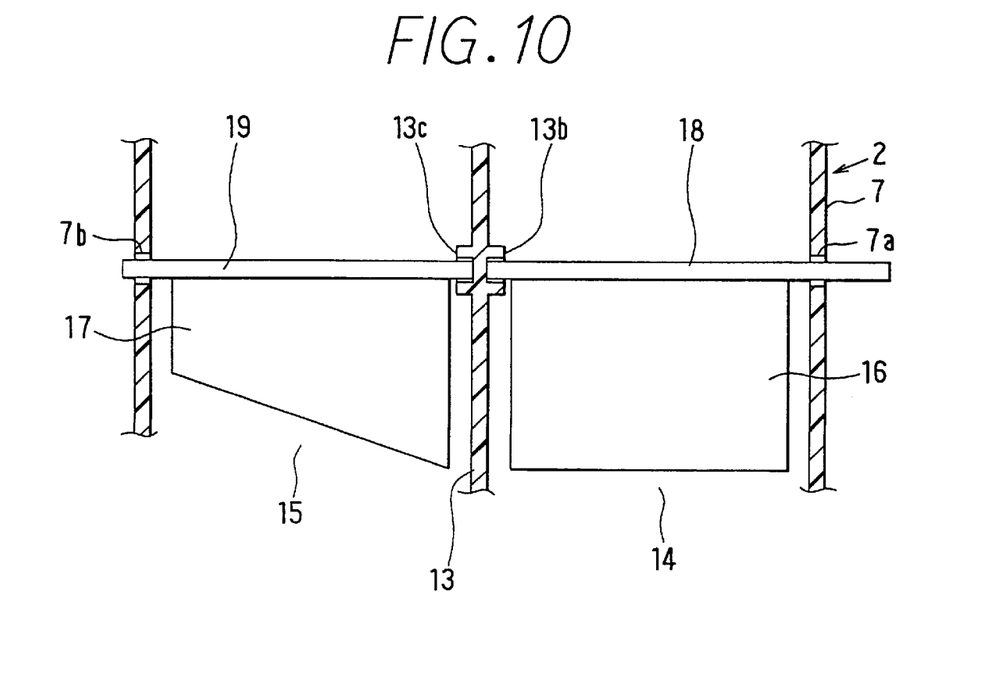
FIG. 10 is a schematic sectional view showing a supporting structure of rotation shafts of first and second air-mixing doors according to a third preferred embodiment of the present invention.

A third preferred embodiment of the present invention will be now described with reference to FIG. 10. In the third embodiment, the structure for supporting the rotation shafts of the first and second air-mixing doors 16, 17 in the second embodiment is changed, and the other portions are similar to those in the second embodiment. As shown in FIG. 10, both cylindrical boss portions 13b, 13c are formed in the partition member 13 to protrude from the partition member 13, one end of the rotation shaft 18 of the first air-mixing door 16 is rotatably held in an inner hole of the boss portion 13b, and one end of the rotation shaft 19 of the second air-mixing door 17 is rotatably held in an inner hole of the boss portion 13c.

A fourth preferred embodiment of the present invention will be now described with reference to FIG. 11.

In the above-described first embodiment, the evaporator 8 is disposed in the air conditioning case 7 in such a manner that air blown by the blower 4 is introduced into the evaporator 8 from below and passes through the evaporator 8 upwardly. However, as shown in FIG. 11, in the fourth embodiment, the evaporator 8 is disposed at a lower side of the blower 4. Therefore, air blown by the blower 4 is introduced into the evaporator 8 from an upper side of the evaporator 8, and passes through the evaporator 8 downwardly. Air having passed through the evaporator 8 is introduced into the heater core 9 from below, and passes through the heater core 9 upwardly.

Figure 11:
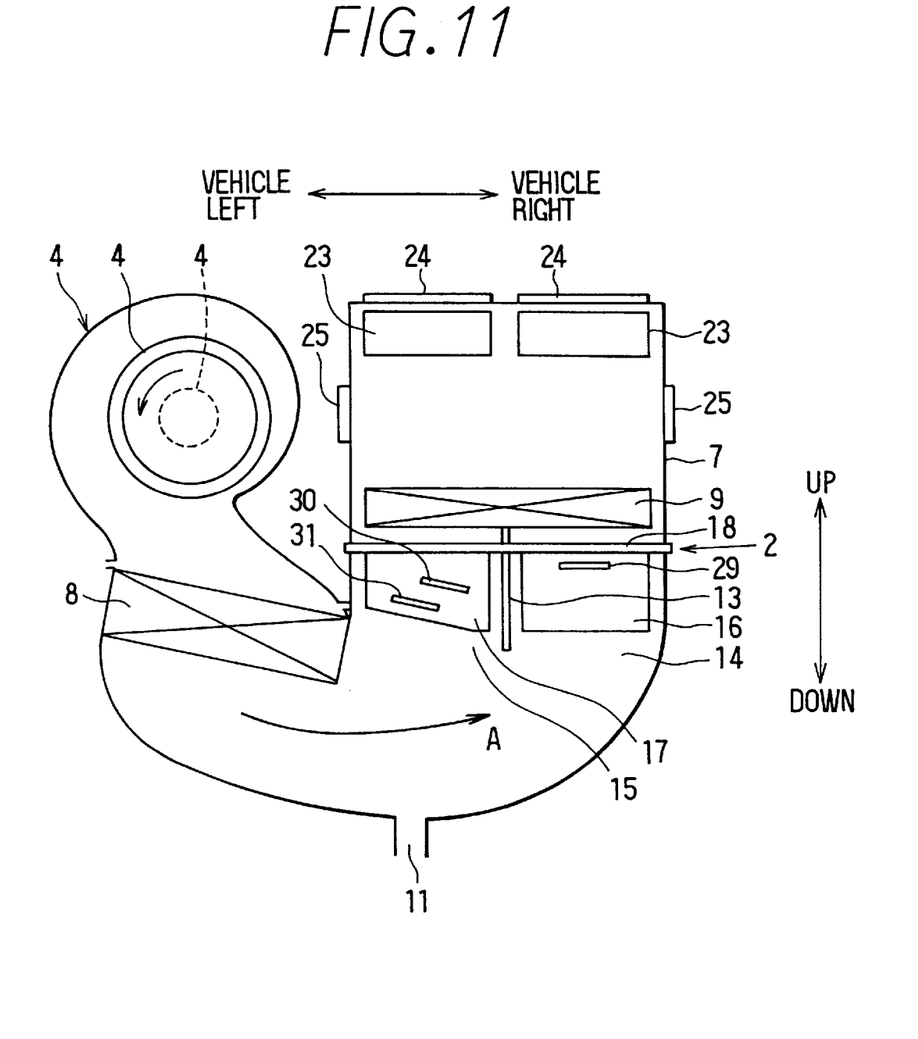
FIG. 11 is a schematic sectional view showing an air conditioning apparatus according to a fourth preferred embodiment of the present invention.

In the fourth embodiment, air having passed through the evaporator 8 flows approximately horizontally in the width direction of the vehicle as shown by arrow A in FIG. 11, and the heater core 9 and the bypass passage 12 are arranged in a direction perpendicular to the air-blowing direction A (i.e., width direction of the vehicle) similarly to the first embodiment. Further, similarly to the first embodiment, the air guide plates 29–31 are provided in the first and second air-mixing doors 16, 17, and the partition plate 13 is also provided. Thus, the fourth embodiment has the same air-guiding effect as that of the first embodiment. In the fourth embodiment, the rotation shaft of the blower 4 is disposed approximately horizontally, and a suction port of the blower 4 is set at a vehicle front side of the blower 4. Therefore, the inside/outside air switching box (not shown in FIG. 11) may be disposed at a vehicle front side of the blower 4.

Although the present invention has been fully described in connection with the preferred embodiments thereof with reference to the accompanying drawings, it is to be noted that various changes and modifications will become apparent to those skilled in the art.

For example, in the above-described first and fourth embodiments, the partition member 13 is formed, and the first and second air-mixing doors 16, 17 are rotated by the single common rotation shaft 18. However, in a case where the partition member 13 is not provided and the ununiform flow distribution of air is prevented only using the air guide plates 29–31, the first and second air-mixing doors 16, 17 can use a single door rotated by the rotation shaft 18.

In each of the above-described embodiments, the air guide plates 29–31 are formed on the surfaces of the first and second air-mixing doors 16, 17, positioned at the side of the bypass passage 12. However, the air guide plates may be additionally formed on the surfaces of the first and second air-mixing doors 16, 17, positioned at a side of the heater core 9 so that the flow distribution of air at the side of the heater core 9 can be made uniform. Particularly, during the maximum heating mode where the first and second air-mixing doors 16, 17 fully closes the bypass passage 12 and fully opens an air passage of the heater core 9, by the air guide plates 29–31 provided at the side of the heater core 9, the uniform effect of the flow distribution is effectively improved.

Further, it is necessary to preferentially achieve the uniform flow distribution in an air passage at the side of the heater core 9, the air guide plates may be formed on the surfaces of the first air-mixing doors 16, 17, positioned only at the side of the heater core 9.

In the above-described embodiments, the evaporator 8 is disposed under the heater core 9 or under the blower 4.

However, the present invention may be applied to an air conditioning apparatus in which the evaporator 8 is not provided. In this case, air blown by the blower 4 flows approximately horizontally at a lower side of the heater core 9, and thereafter flows through the heater core 9 upwardly from below. In the air conditioning apparatus, an air mixing door having air guide plates is disposed at a lower side of the heater core 9.

Such changes and modifications are to be understood as being within the scope of the present invention as defined by the appended claims.

What is claimed is:

1. An air conditioning apparatus for a vehicle, comprising:
   an air conditioning case for forming an air passage;
   a blower for blowing air toward said air passage;
   a cooling heat exchanger, disposed in said air conditioning case approximately horizontally, for cooling air blown by said blower;
   a heating heat exchanger, for heating air from said cooling heat exchanger, said heating heat exchanger being disposed in said air conditioning case approximately horizontally to form a bypass passage through which air having passed through said cooling heat exchanger bypasses said heating heat exchanger;
   an air-mixing door, disposed between said cooling heat exchanger and said heating heat exchanger, for adjusting a ratio between an amount of air passing through said heating heat exchanger and an amount of air passing through said bypass passage; and
   an air guide plate, formed on a surface of said air-mixing door, for guiding air, wherein:
      said blower is disposed in such a manner that air blown by said blower has an air-blowing direction extending approximately horizontally at a lower side of said heating heat exchanger in said air conditioning case;
      said heating heat exchanger is disposed at an upper side of said cooling heat exchanger so that air from said cooling heat exchanger upwardly flows through said heating heat exchanger from below;
      said heating heat exchanger and said bypass passage are arranged adjacently in a direction perpendicular to said air-blowing direction; and
      said air guide plate is formed to prevent air blown by said blower from mainly flowing toward a forward side in said air-blowing direction.

2. The air conditioning apparatus according to claim 1, wherein said air guide plate guides air passing through said air passage from a forward side toward a backward side in said air-blowing direction.

3. The air conditioning apparatus according to claim 1, wherein:

said air passage has a lower passage lower than said cooling heat exchanger; and air blown by said blower flows in said air-blowing direction through said lower passage.

4. The air conditioning apparatus according to claim 3, wherein said cooling heat exchanger is disposed at a lower side of said heating heat exchanger, in such a manner that air blown from said blower flows through said cooling heat exchanger upwardly from below after flowing through said lower passage in said air-blowing direction.

5. The air conditioning apparatus according to claim 3, wherein:

said cooling heat exchanger is disposed under said blower in such a manner that air blown from said blower is introduced into an upper side of said cooling heat exchanger, flows through said cooling heat exchanger downwardly, flows said lower passage in said air-blowing direction, and then flows upwardly toward said heating heat exchanger.

6. The air conditioning apparatus according to claim 4, wherein said cooling heat exchanger is inclined downwardly by a predetermined angle toward a forward side of said air-blowing direction.

7. The air conditioning apparatus according to claim 1, wherein:

said air-blowing direction is approximately in a width direction of the vehicle; and said heating heat exchanger and said bypass passage are arranged adjacently in a front-rear direction of the vehicle.

8. The air conditioning apparatus according to claim 1, wherein said air guide plate is formed on a surface of said air-mixing door, positioned at a side of said bypass passage.

9. The air conditioning apparatus according to claim 1, wherein said air guide plate is formed on a surface of said air-mixing door, positioned at a side of said heating heat exchanger.

10. The air conditioning apparatus according to claim 1, further comprising a partition member for partitioning an air passage between said cooling heat exchanger and said heating heat exchanger into a first air passage at a forward side of said air-blowing direction and a second air passage at a backward side of said air-blowing direction, wherein said air-mixing door includes a first door disposed in said first air passage, and a second door disposed in said second air passage.

11. The air conditioning apparatus according to claim 10, wherein said first door and said second door are rotated integrally.

12. The air conditioning apparatus according to claim 10, wherein said first door and said second door are respectively independently rotated.

13. The air conditioning apparatus according to claim 1, wherein said air guide plate is formed integrally with said air-mixing door to protrude from a surface of said air-mixing door.

14. An air conditioning apparatus for a vehicle, comprising:

an air conditioning case for forming an air passage;

a blower for blowing air toward said air passage;

a heating heat exchanger, for heating air passing therethrough, said heating heat exchanger being disposed at a side of said blower in said air conditioning case approximately horizontally to form a bypass passage through which air bypasses said heating heat exchanger;

an air-mixing door, for adjusting a ratio between an amount of air passing through said heating heat exchanger and an amount of air passing through said bypass passage; and an air guide plate, formed on a surface of said air-mixing door, for guiding air, wherein:

said blower and said heating heat exchanger are disposed in such a manner that air blown by said blower has an air-blowing direction extending approximately horizontally at a lower side of said heating heat exchanger in said air conditioning case, and air flows through said heating heat exchanger upwardly from below;

said heating heat exchanger and said bypass passage are arranged adjacently in a direction perpendicular to said air-blowing direction; and said air guide plate guides air blown by said blower from a forward side in said air-blowing direction toward a backward side in said air-blowing direction.

15. The air conditioning apparatus according to claim 14, further comprising a cooling heat exchanger for cooling air blown from said blower, wherein said cooling heat exchanger is disposed in said air conditioning case approximately horizontally at a lower side of said heating heat exchanger in such a manner that air blown from said blower flows through said cooling heat exchanger upwardly from below after flowing in said air-blowing direction.

16. The air conditioning apparatus according to claim 14, further comprising a cooling heat exchanger for cooling air blown from said blower, wherein said cooling heat exchanger is disposed in said air conditioning case approximately horizontally at a lower side of said blower in such a manner that air blown from said blower flows through said cooling heat exchanger downwardly from above, and then flows in said air-blowing direction toward said heating heat exchanger.

* * * * *